United States Patent

Kimura

Patent Number: 6,026,071
Date of Patent: Feb. 15, 2000

[54] OPTICAL DISK PLAYER

[75] Inventor: Motoi Kimura, Kanagawa, Japan

[73] Assignee: Sony Corporation, Tokyo, Japan

[21] Appl. No.: 08/951,849

[22] Filed: Oct. 16, 1997

[30] Foreign Application Priority Data

Oct. 18, 1996 [JP] Japan ................................ 8-276008

[51] Int. Cl.$^7$ ................................ G11B 7/00; G11B 3/90
[52] U.S. Cl. ............................ 369/124; 369/54; 369/116
[58] Field of Search ................................ 369/47, 48, 50, 369/54, 58, 106, 107, 116, 124

[56] References Cited

U.S. PATENT DOCUMENTS

| | | | |
|---|---|---|---|
| 4,150,402 | 4/1979 | Tietze et al. ......................... | 369/116 X |
| 5,250,796 | 10/1993 | Taguchi et al. ...................... | 369/116 X |
| 5,363,363 | 11/1994 | Gage ..................................... | 369/116 |

*Primary Examiner*—Paul W. Huber
*Attorney, Agent, or Firm*—Frommer Lawrence & Haug, LLP; William S. Frommer

[57] ABSTRACT

An optical disk player for obtaining a read data signal by the use of laser light beams incident on an optical disk, wherein any laser noise component included in the read data signal due to wavelength and power variation in the light beam incident on the optical disk can be suppressed efficiently and completely. The optical disk player comprises a first light receiver for producing a read output signal by detecting a light beam which is based on the laser light emitted from a semiconductor laser device to be incident on the optical disk and is reflected therefrom; a read signal processor for producing a read data signal on the basis of the read output signal; a second light receiver for partially detecting the light beam transmitted toward the optical disk to be incident thereon and producing a variation detection signal representative of any variation in the detected light beam; and a noise suppressor for reducing the laser noise component in the read data signal by first inverting the phase of the variation detection signal obtained from the second light receiver and then adding the phase-inverted signal to the read data signal outputted from the read signal processor.

9 Claims, 13 Drawing Sheets

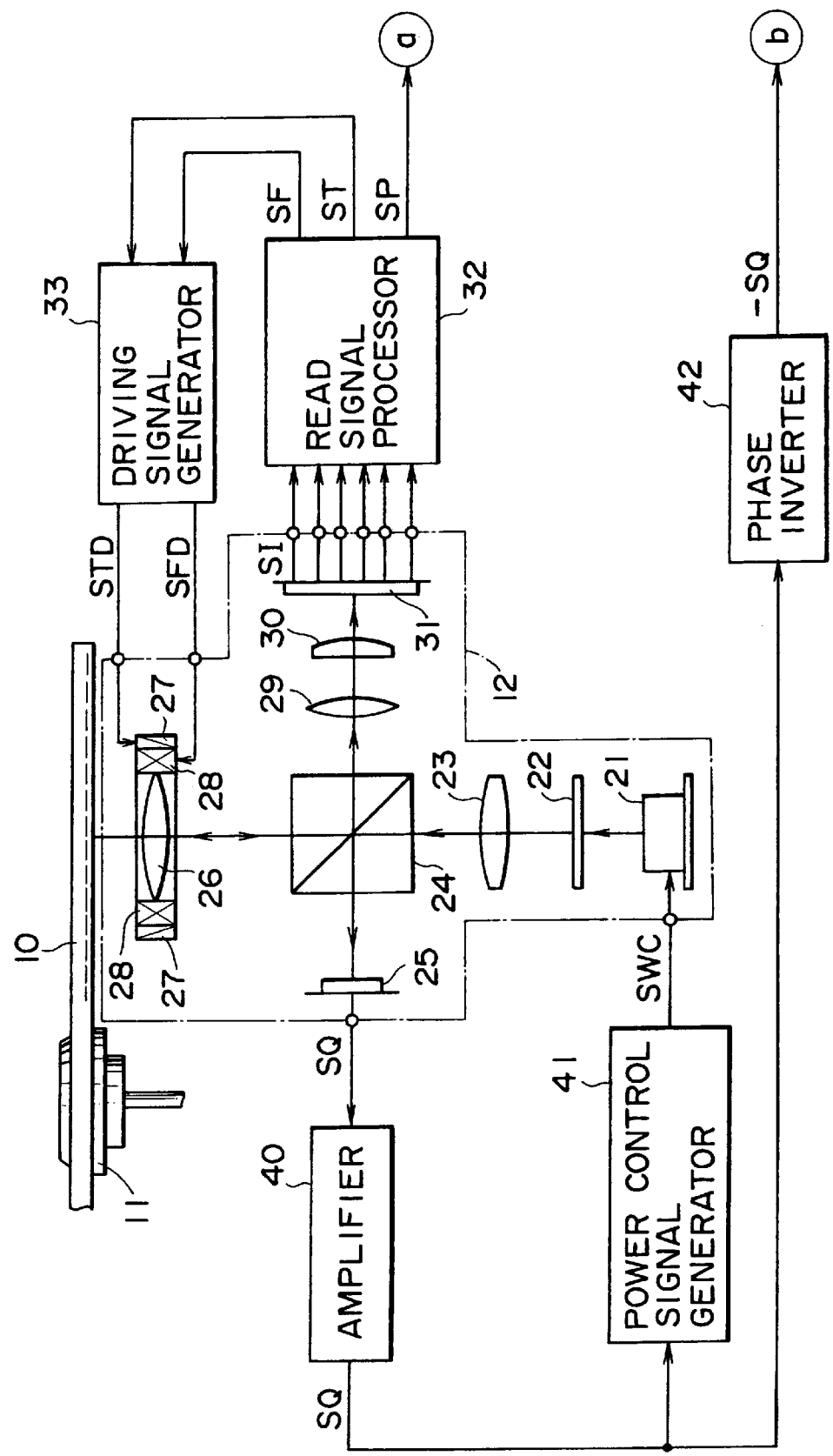
FIG. IA

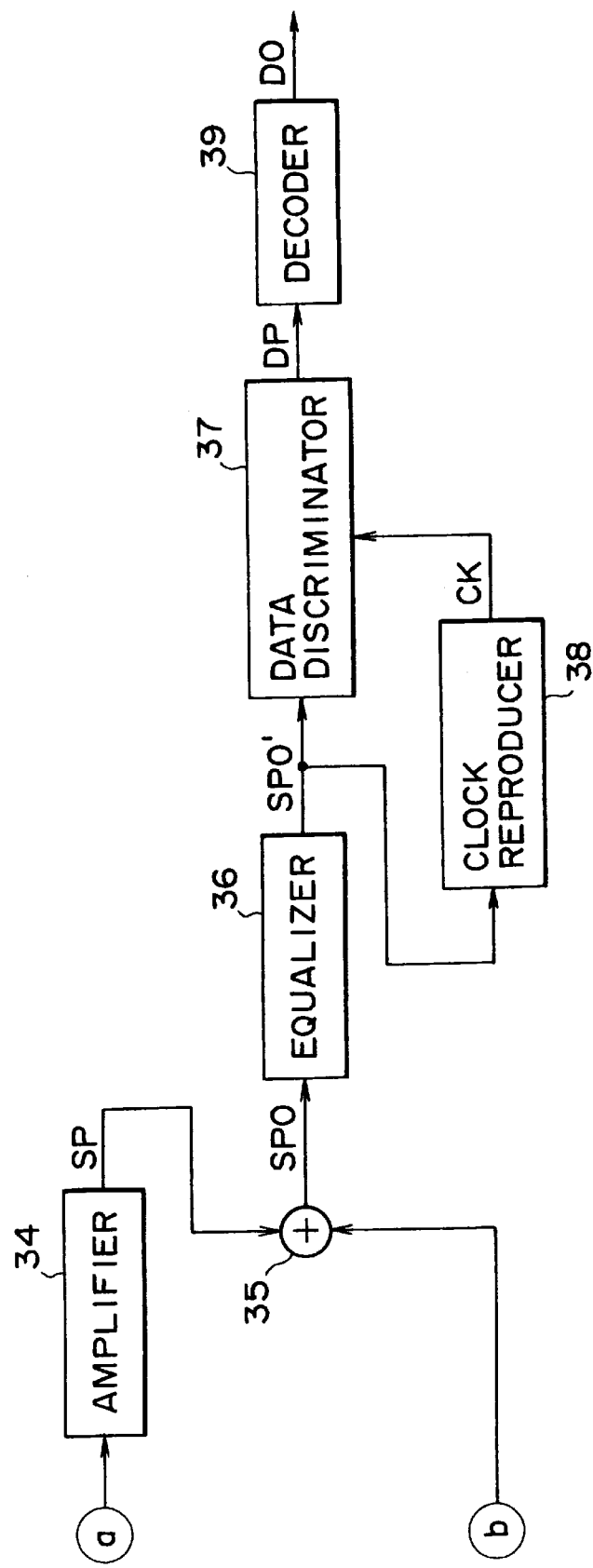

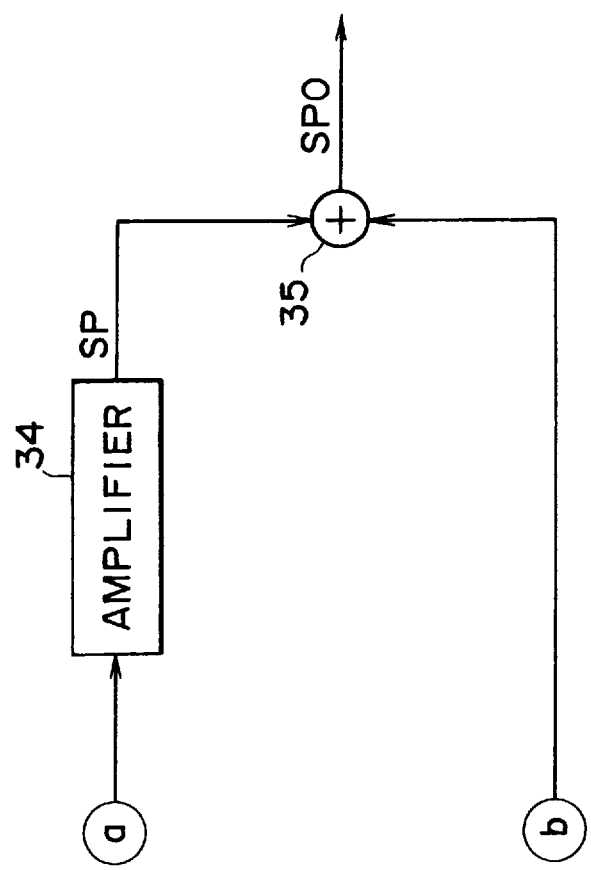

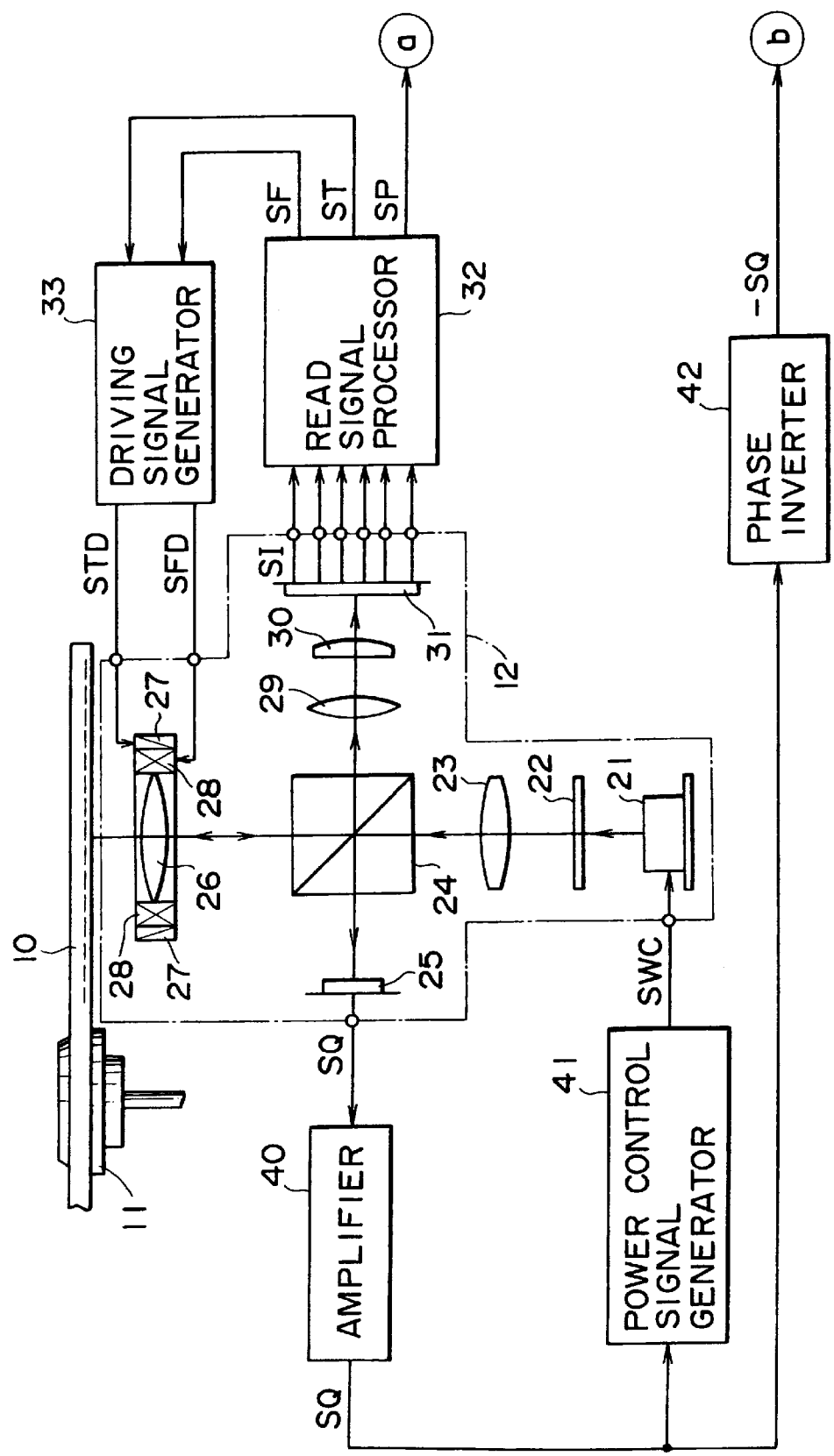

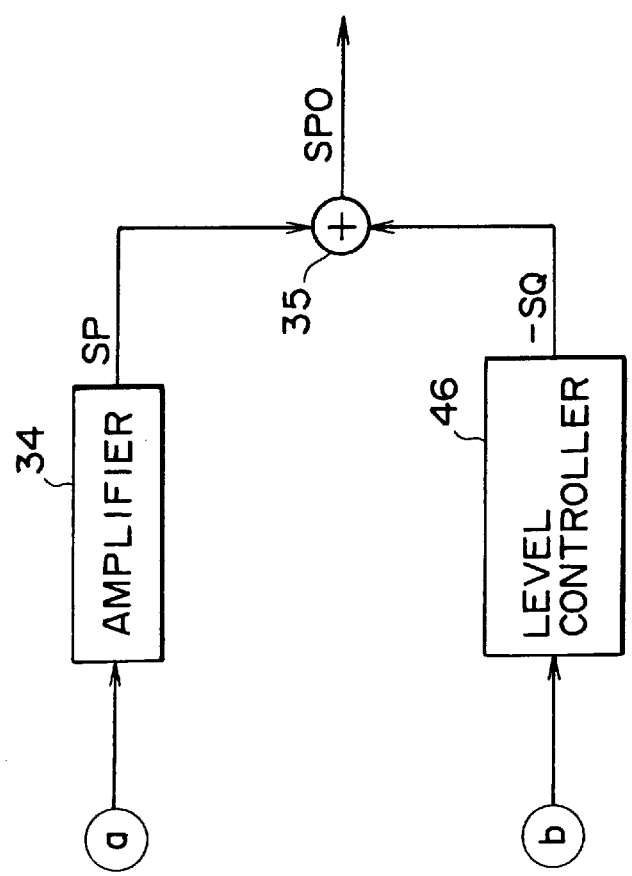

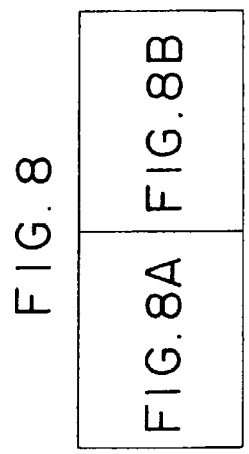
FIG. 8B
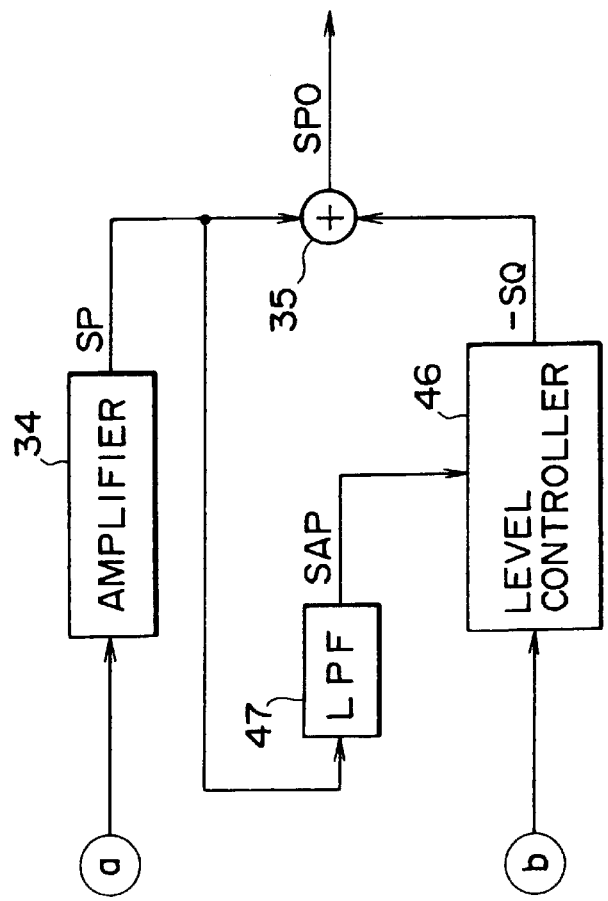

OPTICAL DISK PLAYER

BACKGROUND OF THE INVENTION

The present invention relates to an optical disk player wherein a read output signal is obtained by detecting a laser beam emitted to be incident on a data-recorded optical disk and reflected therefrom, and the recorded data are reproduced on the basis of such read output signal.

In optical disks used widely as data recording media, there exist some different types including, for example, one where recorded data are merely readable for general users but new data recording is impossible, and another where recorded data are readable and further new data recording is also possible. However, in any type of such optical disks, an operation of reading the recorded data is performed under conditions that a light beam is emitted to be incident on a data recording plane of the disk being driven at a predetermined rotation speed, and the data recorded portion is scanned by the light beam.

Various types of optical disk players are proposed currently as apparatus for reading recorded data from such an optical disk and obtaining reproduced data. An optical disk player comprises, as its fundamental component units, a disk driver for rotating an optical disk at a predetermined speed, an optical head for causing a light beam to be incident on a data recording plane of the optical disk being rotated, and then detecting therefrom a reflected light beam or a transmitted light beam to obtain a read output signal as a detection output, a read signal processor for obtaining a read data signal by processing the read output signal from the optical head, and a data reproducer for reproducing the data on the basis of the read data signal obtained from the read signal processor. Normally the optical disk player further has a tracking servo control system for properly maintaining the incidence position of the light beam emitted from the optical head to be incident on the data recording plane of the optical disk, and a focus servo control system for properly maintaining the focus state at the incidence position of the light beam emitted from the optical head to be incident on the data recording plane of the optical disk.

In such optical disk player, the light beam emitted to be incident on the optical disk for detecting the data recorded thereon is composed generally of a laser beam. More specifically, a laser light source consisting of a semiconductor laser device to perform single longitudinal-mode light emission (single wavelength light emission) is incorporated in the optical head to form a laser beam which is composed of the laser light emitted from the laser light source, and the laser beam is caused to be incident on the optical disk.

The laser beam incident on the optical disk is reflected therefrom while the intensity thereof is modulated in accordance with the data recorded on the disk, and then the reflected laser beam is guided to a light receiver incorporated in the optical head. Subsequently in response to the reflected laser beam from the optical disk, the light receiver generates a read output signal proportional to the intensity-modulated state of the reflected laser beam and then sends the output signal to a read signal processor.

In the semiconductor laser device which constitutes a laser light source in the optical disk player as mentioned and performs single longitudinal-mode light emission, there occurs a transition of the light emission mode due to the temperature fluctuation induced during the operation or some other influence of a return beam and so forth caused by reflection of the emitted laser beam, and consequently the wavelength and the power of the emitted laser beam are varied. Such wavelength and power variation in the laser beam emitted from the laser light source brings about an undesired situation where the read data signal, which is obtained from the read signal processor having received the read output signal from the light receiver, includes some noise component derived from the laser beam variation (hereinafter referred to as laser noise component).

The laser noise component included in the read data signal lowers the S/N (signal-to-noise ratio) in the read data signal to consequently exert harmful influence on the reproduced data outputted from the data reproducer which serves to reproduce the data on the basis of the read data signal. More concretely, such harmful influence on the reproduced data deteriorates the error rate in the reproduced data obtained in digital form, or lowers the S/N in the analog audio or video signal obtained as reproduced data.

In order to reduce the wavelength and power variation in the laser beam emitted from the semiconductor laser device constituting the laser light source, it has been customary heretofore to adopt some techniques of executing high frequency control with regard to the semiconductor laser device which performs single longitudinal-mode light emission, or employing a different laser device which performs multiple longitudinal-mode light emission. High frequency control for the semiconductor laser device of single longitudinal-mode light emission type is executed by operating the same through on/off driving with a high frequency signal of several hundred MHz or so. A semiconductor laser device has such characteristic as to perform multiple longitudinal-mode light emission when its operation is in an instantaneous on-state, so that multiple longitudinal-mode light emission seems to be continuous falsely if fast on/off driving is repeated at a high frequency. Meanwhile, in using another device of multiple longitudinal-mode light emission type, transition of the light emission mode is diminished to consequently suppress the wavelength and power variation in the emitted laser beam. Therefore, due to such high frequency control for a semiconductor laser device of single longitudinal-mode light emission type, it becomes possible to reduce the wavelength and power variation in the laser beam emitted therefrom.

Meanwhile the semiconductor laser device of multiple longitudinal-mode light emission type used as a laser light source is structurally so contrived that its state of multiple longitudinal-mode light emission is kept continuous merely by DC driving. In such semiconductor laser device where a multiple longitudinal-mode light emission state thereof is kept continuous, the transition of the light emission mode resulting from any temperature fluctuation or return light during the operation is suppressed to consequently reduce the wavelength and power variation in the emitted laser beam.

However, when high frequency control is to be performed for the semiconductor laser device of single longitudinal-mode light emission type, it is necessary in the circuit configuration to incorporate a high frequency oscillator and a high frequency driver. Although the wavelength and power variation in the laser beam emitted from the semiconductor laser device is thus reduced with certainty, such variation is still left partly to some extent, and it is difficult to achieve complete suppression of the laser noise component included in the read data signal.

Meanwhile in the case of using a laser device of multiple longitudinal-mode light emission type, there exist some difficulties in manufacture of a superior device which is capable of emitting a laser beam with a relatively greater power in comparison with a semiconductor laser device of single longitudinal-mode light emission type, and another disadvantage is unavoidable in relation to a short service life. Further, even in the use of a multiple longitudinal-mode light emitting laser device, the wavelength and power variation in the laser beam emitted from the semiconductor laser device is still left partly to some extent although being reducible with certainty, and any wavelength and power error of the laser beam derived from the individual deviation of the multiple longitudinal-mode light emitting laser device is not corrected, so that the laser noise component included in the read data signal fails to be completely suppressed.

SUMMARY OF THE INVENTION

It is an object of the present invention to provide an optical disk player wherein a light beam based on laser light emitted from a light source is caused to be incident on an optical disk, then a read output signal is obtained by detecting the return beam reflected from the optical disk after being modulated in accordance with the recorded data on the optical disk, and a read data signal is obtained on the basis of such read output signal. And even when there exists some wavelength and power variation in the laser beam emitted from the light source, the optical disk player is capable of efficiently and completely suppressing the laser noise component included in the read data signal derived from such variation.

According to an aspect of the present invention, there is provided an optical disk player which comprises a light source capable of emitting laser light therefrom; a first light receiver for producing a read output signal by detecting a light beam reflected from an optical disk, the said light beam being based on the laser light emitted from the light source to be incident on the optical disk and reflected therefrom after being modulated in accordance with data recorded on the optical disk; and a read signal processor for producing a read data signal on the basis of the read output signal obtained from the first light receiver. The optical disk player further comprises a second light receiver for partially detecting the light beam transmitted toward the optical disk to be incident thereon, and producing a variation detection signal representative of any variation in the detected light beam; and a noise suppressor for reducing the laser noise component included in the read data signal by first inverting the phase of the variation detection signal obtained from the second light receiver and then adding the phase-inverted variation detection signal to the read output signal obtained from the first light receiver or to the read data signal obtained from the read signal processor.

In the optical disk player of the present invention having such a configuration, the second light receiver for producing a variation detection signal by partially detecting the laser beam transmitted toward the optical disk to be incident thereon is incorporated in addition to the first light receiver for producing a read output signal by detecting the light beam reflected from the optical disk, and under such condition, the noise suppressor inverts the phase of the variation detection signal obtained from the second light receiver, and then adds the phase-inverted signal to either the read output signal obtained from the first light receiver or the read data signal from the read signal processor, whereby the laser noise component included in the read data signal from the read signal processor is canceled and reduced by the phase-inverted variation detection signal outputted from the second light receiver. Therefore, due to proper adjustment of the level of the phase-inverted variation detection signal obtained from the second light receiver, the laser noise component included in the read data signal outputted from the read signal processor can be suppressed efficiently and completely in the relatively simplified configuration.

The above and other features and advantages of the present invention will become apparent from the following description which will be given with reference to the illustrative accompanying drawings.

BRIEF DESCRIPTION OF THE DRAWINGS

FIGS. 1A and 1B are block connection diagrams showing principal component units in a first embodiment of the optical disk player of the present invention;

FIGS. 6A and 6B are block connection diagrams showing principal component units in a second embodiment of the optical disk player of the invention;

FIGS. 7A and 7B are block connection diagrams showing principal component units in a third embodiment of the optical disk player of the invention;

FIGS. 8A and 8B are block connection diagrams showing principal component units in a fourth embodiment of the optical disk player of the invention.

DETAILED DESCRIPTION OF THE PREFERRED EMBODIMENTS

Figure 2:
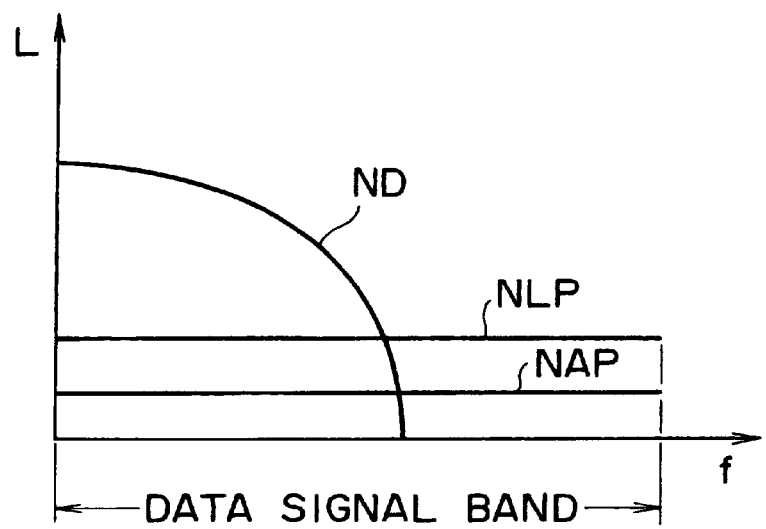
FIGS. 2 to 5 are characteristic diagrams for explaining the operation for noise reduction in the embodiments of the optical disk player of the invention.

FIG. 1 shows principal component units which constitute a first embodiment of the optical disk player according to the present invention. In the embodiment of FIG. 1, an optical disk 10 is loaded in a disk loader 11 and is rotated together with the disk loader 11 which is driven at a predetermined rotation speed. The optical disk 10 contains, for example, digital data recorded in record tracks formed on a data recording plane of the disk 10. And an optical head 12 is disposed opposite to the disk 10.

The optical head 12 is equipped with a light source to emit laser light therefrom, i.e., with a semiconductor laser device 21 constituting a laser light source. Laser light emitted from the semiconductor laser device 21 is formed into primary light by a grating plate 22 and then is incident on a collimator lens 23, through which the light rays are rendered parallel to be thereby formed into three light beams inclusive of two beams composed of the primary light. The two light beams composed of the primary light are used for detection of a tracking error on the data recording plane of the disk 10, while another light beam is used for reading out the digital data from the data recording plane of the disk 10. Thus, three parallel laser beams are actually existent in the optical path posterior to the collimator lens 23, but such beams are denoted by a single line in FIG. 1 for simplifying the diagram.

The laser beams from the collimator lens 23 are incident on a beam splitter 24, where the beams are partially reflected to be incident on a light receiver 25 while the other portions thereof pass through the beam splitter 24. Subsequently the laser beam having passed through the beam splitter 24 is incident on an objective lens 26 to be thereby focused, and the beam thus focused is transmitted from the optical head 12 and then is incident on the data recording plane of the disk 10.

The objective lens 26 is equipped with a driving means 27 comprising a tracking control coil device and also with another driving means 28 comprising a focus control coil device. Such driving means 27 and 28 execute tracking control and focus control, respectively, for controlling the position of the objective lens 26 in a direction to traverse the record tracks formed on the data recording plane of the disk 10 and in a direction toward or away from the disk 10.

The intensity of each laser beam incident on the data recording plane of the disk 10 is modulated in accordance with the digital data recorded in the record track on the data recording plane of the disk 10 and also with such record track formed on the data recording plane of the disk 10. The three laser beams reflected from the data recording plane of the disk 10 are returned therefrom to be incident on the beam splitter 24 via the objective lens 26 through which the light rays are rendered parallel. The reflected laser beams incident on the beam splitter 24 are further reflected therefrom to be incident on a light receiver 31 via a condenser lens 29 and a cylindrical lens 30.

The light receiver 31 incorporates therein a plurality of optical detection elements disposed in a predetermined arrangement. In the light receiver 31, the three reflected laser beams, whose intensities are modulated correspondingly to the digital data recorded in the record tracks on the data recording plane of the disk 10 and also to the record tracks formed on the data recording plane of the disk 10, are detected individually by such plurality of optical detection elements, and there is produced a read output signal SI which includes the detection output signals relative to the three reflected laser beams obtained respectively from the optical detection elements.

The read output signal SI obtained in the light receiver 31 is supplied from the optical head 12 to a read signal processor 32. Subsequently the read signal processor 32 produces, in response to the read output signal SI supplied thereto, a focus error signal SF representing the focus state of the laser beam incident on the data recording plane of the disk 10, a tracking error signal ST representing the deviation of the incidence position of the laser beam on the data recording plane of the disk 10 from the center of each record track, and a read data signal SP representing the digital data read out from the record track on the data recording plane of the disk 10. The signals thus produced are then outputted from the read signal processor 32.

The focus error signal SF and the tracking error signal ST from the read signal processor 32 are supplied to a driving signal generator 33, which generates a focus control signal SFD based on the focus error signal SF and a tracking control signal STD based on the tracking error signal ST. Subsequently the tracking control signal STD is supplied to the driving means 27 comprising a tracking control coil device, while the focus control signal SFD is supplied to the driving means 28 comprising a focus control coil device.

The read data signal SP from the read signal processor 32 is amplified in an amplifier 34 having a relatively wide amplification band characteristic above 10 MHz for example. The signal thus amplified is supplied to a signal adder 35 to form a read data signal SPO, which is then supplied to an equalizer 36. Subsequently the frequency characteristic relative to the read data signal SPO is corrected in the equalizer 36, and a read data signal SPO obtained through such frequency characteristic correction in the equalizer 36 is supplied to both a data discriminator 37 and a clock reproducer 38.

A clock signal CK is reproduced in the clock reproducer 38 on the basis of the data clock included in the read data signal SPO', and then the clock signal CK is supplied to the data discriminator 37. Subsequently, data discrimination is performed in the data discriminator 37 in accordance with the clock signal CK related to the read data signal SPO', whereby digital data DP based on the read data signal SPO' is obtained. Thereafter the digital data DP outputted from the data discriminator 37 is supplied to a decoder 39, where the digital data DP is decoded to become reproduced output data DO.

Thus, the laser beams incident on the beam splitter 24 from the collimator lens 23, i.e., the laser beams transmitted toward the optical disk 10 from the collimator lens 23 to be incident on the disk 10, are partially reflected by the beam splitter 24 and then are incident on the light receiver 25. This light receiver 25 incorporates optical detection elements which are functionally equal to those incorporated in the light receiver 31 and serving to detect the reflected laser beams having intensity changes corresponding to the digital data recorded in the record tracks on the data recording plane of the disk 10. And in the light receiver 25, the laser beams transmitted toward the optical disk 10 from the collimator lens 23 to be incident on the disk 10 are partially detected, whereby a variation detection signal SQ corresponding to the intensity variation is obtained.

The variation detection signal SQ obtained from the light receiver 25 represents the intensity variation of the laser beam transmitted toward the optical disk 10 from the collimator lens 23 to be incident on the disk 10, i.e., the level change corresponding to the wavelength and power variation in the laser light emitted from the semiconductor laser device 21 which constitutes a laser light source. The variation detection signal SQ is amplified by an amplifier 40 having an amplification band characteristic equal to that of the amplifier 34 provided to amplify the read data signal SP obtained from the read signal processor 32, and then the amplified signal is supplied to both a power control signal generator 41 and a phase inverter 42.

In the power control signal generator 41, a power control signal SWC is generated on the basis of the variation detection signal SQ. And then the power control signal SWC thus obtained from the power control signal generator 41 is supplied to the semiconductor laser device 21 to control the operation thereof in such a manner that the power of the laser light emitted from the semiconductor laser device 21 is maintained constant by the power control signal SWC.

Meanwhile in the phase inverter 42, the phase of the variation detection signal SQ supplied thereto from the amplifier 40 is inverted. Subsequently the phase-inverted variation detection signal –SQ obtained from the phase inverter 42 is supplied to a signal adder 35, where the phase-inverted variation detection signal –SQ is added to the read data signal SP outputted from the amplifier 34.

The read data signal SP supplied from the amplifier 34 to the signal adder 35 may include some laser noise component derived from the wavelength and power variation of the laser light emitted from the semiconductor laser device 21, but the variation detection signal SQ obtained from the amplifier 40 has the level change corresponding to the wavelength and power variation of the laser light emitted from the semiconductor laser device 21, and such level change is similar to the laser noise component included in the read data signal SP, so that the phase-inverted variation detection signal –SQ obtained from the phase inverter 42 is in an opposite-phase relation to the laser noise component included in the read data signal SP. Therefore, due to the addition of the phase-inverted variation detection signal –SQ to the read data signal SP in the signal adder 35, any laser noise component included in the read data signal SP is canceled and reduced by the phase-inverted variation detection signal −SQ.

FIG. 2 (abscissa: frequency f, ordinate: level L) graphically shows an example of the noise component in the read data signal SP which is obtained from the amplifier 34 and contains the laser noise component. In this example, the noise component includes disk noise component ND caused in accordance with the condition of the data recording plane of the optical disk 10, amplifier noise component NAP derived from the amplifier 34, and laser noise component NLP. Since the band is limited in conformity with the space frequency characteristic of the optical system in the optical head 12, the level of the disk noise component ND is rendered low in an area of relatively higher frequencies. However, the respective levels of the amplifier noise component NAP and the laser noise component NLP derived from the read signal processor 32 and the amplifier 34 are substantially constant within the data signal band regardless of the frequencies.

Figure 3:
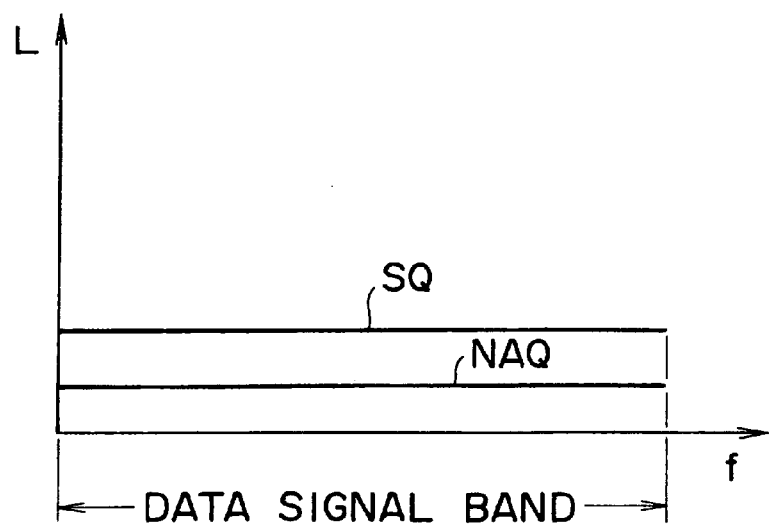

FIG. 3 (abscissa: frequency f, ordinate: level L) graphically shows an example of the variation detection signal SQ obtained from the amplifier 40. The variation detection signal SQ from the amplifier 40 includes the amplifier noise component NAQ derived from the amplifier 40, and the respective levels of the amplifier noise component NAQ and the variation detection signal SQ derived from the amplifier 40 are substantially constant within the data signal band regardless of the frequencies.

Figure 4:
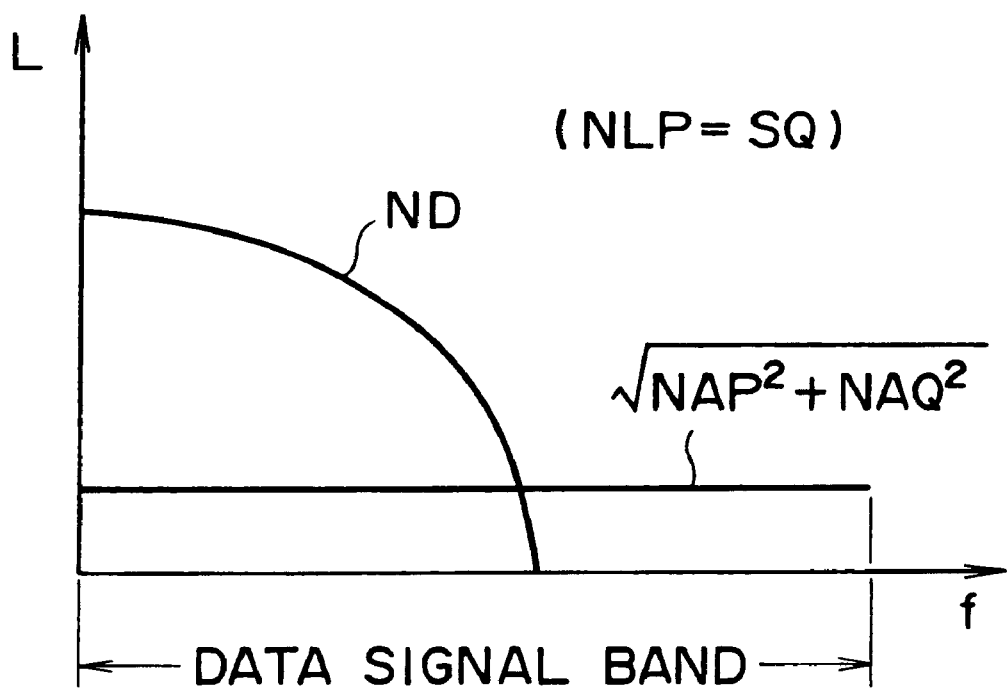

FIG. 4 (abscissa: frequency f, ordinate: level L) graphically shows an example of the noise component in the read data signal SPO obtained from the signal adder 35 as a result of adding the phase-inverted variation detection signal −SQ, which includes the phase-inverted amplifier noise component −NAQ and is based on the variation detection signal SQ including the amplifier noise component NAQ as shown in FIG. 3, to the read data signal SP including the disk noise component ND, the amplifier noise component NAP and the laser noise component NLP as shown in FIG. 2. In this example, the noise component included in the read data signal SPO outputted from the signal adder 35 is composite amplifier noise $\sqrt{(NAP^2+NAQ^2)}$ which is obtained by adding the disk noise component ND, the amplifier noise component NAP and the phase-inverted amplifier noise component −NAQ. The laser noise component NLP and the phase-inverted variation detection signal −SQ completely cancel out each other. More specifically, the phase-inverted variation detection signal −SQ is in an opposite-phase and equal-level relation to the laser noise component NLP included in the read data signal SP. In this case, the laser noise component NLP, which is included in the read data signal SPO outputted from the signal adder 35, is completely eliminated.

Figure 5:
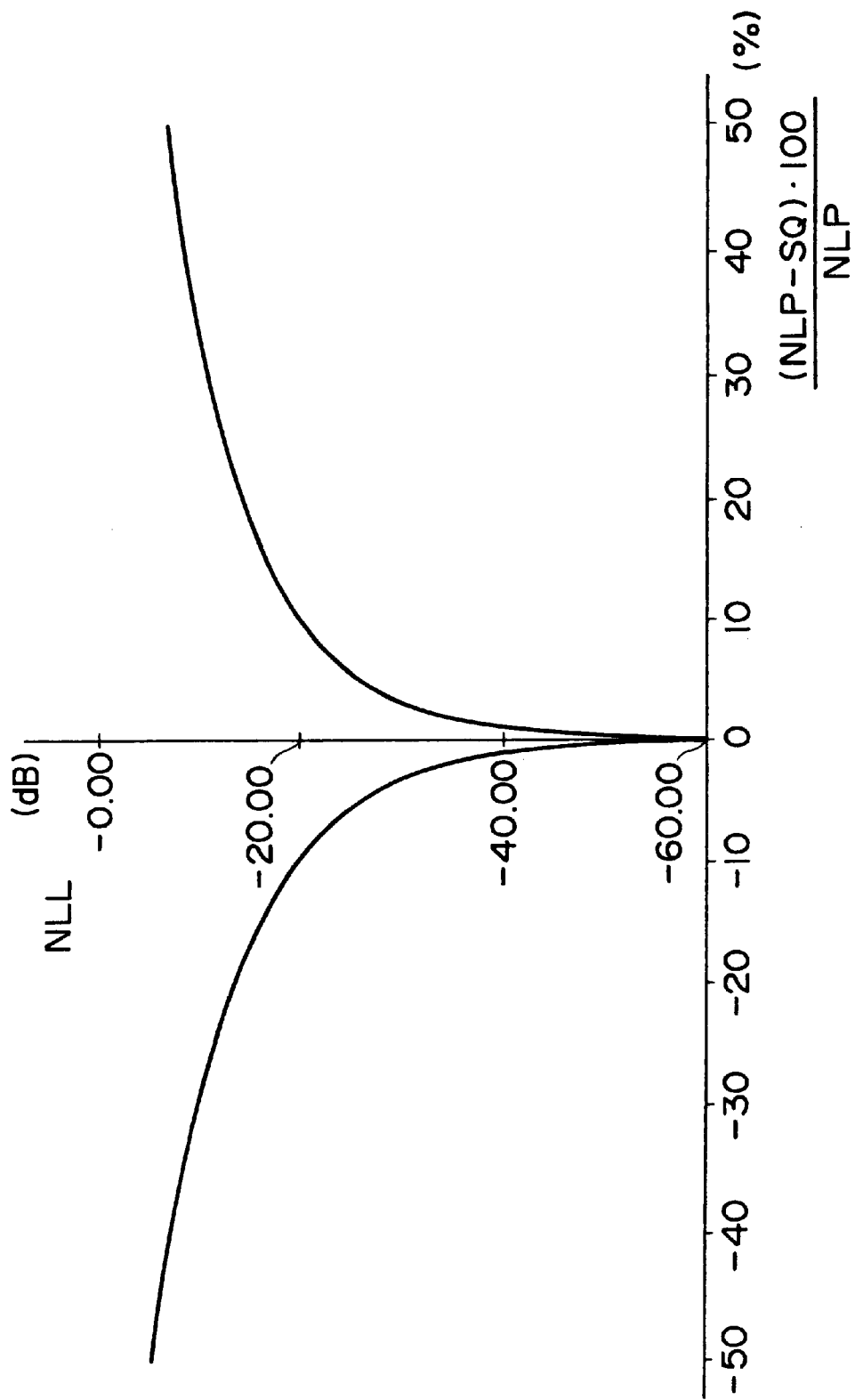

FIG. 5 graphically shows the relationship between the laser noise component NLP remaining in the read data signal SPO and the level difference which is existent between the laser noise component NLP and the phase-inverte d variation detection signal −SQ when the read data signal SPO is obtained from the signal adder 35 as a result of adding the phase-inverted variation detection signal −SQ to the read data signal SP including the laser noise component NLP. In FIG. 5, the abscissa denotes (NLP−SQ)·100/NL(%) which represents the ratio of the level difference between the laser noise component NLP and the phase-inverted variation detection signal −SQ to the level of the laser noise component NLP; and the ordinate denotes the level NLL of the laser noise component NLP remaining in the read data signal SPO.

It is understood from the relationship shown in FIG. 5 that, when the level difference between the laser noise component NLP and the phase-inverted variation detection signal −SQ is zero, i.e., when the level of the laser noise component NLP and that of the phase-inverted variation detection signal −SQ are equal to each other, the level NLL of the laser noise component NLP remaining in the read data signal SPO is reduced to zero, and also that, when it is desired to further lower the level NLL of the laser noise component NLP remaining in the read data signal SPO to be below −20 dB, the ratio of the level difference between the laser noise component NLP and the phase-inverte d variation detection signal −SQ to the laser noise component NLP needs to be less than +10%.

In the embodiment of FIG. 1 mentioned above, the amplifier 40 for amplifying the variation detection signal SQ from the light receiver 25 incorporated in the optical head 12 constitutes, in combination with the phase inverter 42 for inverting the phase of the variation detection signal SQ amplified by the amplifier 40, a noise suppressor which is capable of suppressing the laser noise component included in the read data signal SPO outputted from the signal adder 35 where the phase-inverted variation detection signal −SQ obtained from the phase inverter 42 is added to the read data signal SP outputted from the read signal processor 32 and amplified by the amplifier 34.

Figure 6A:
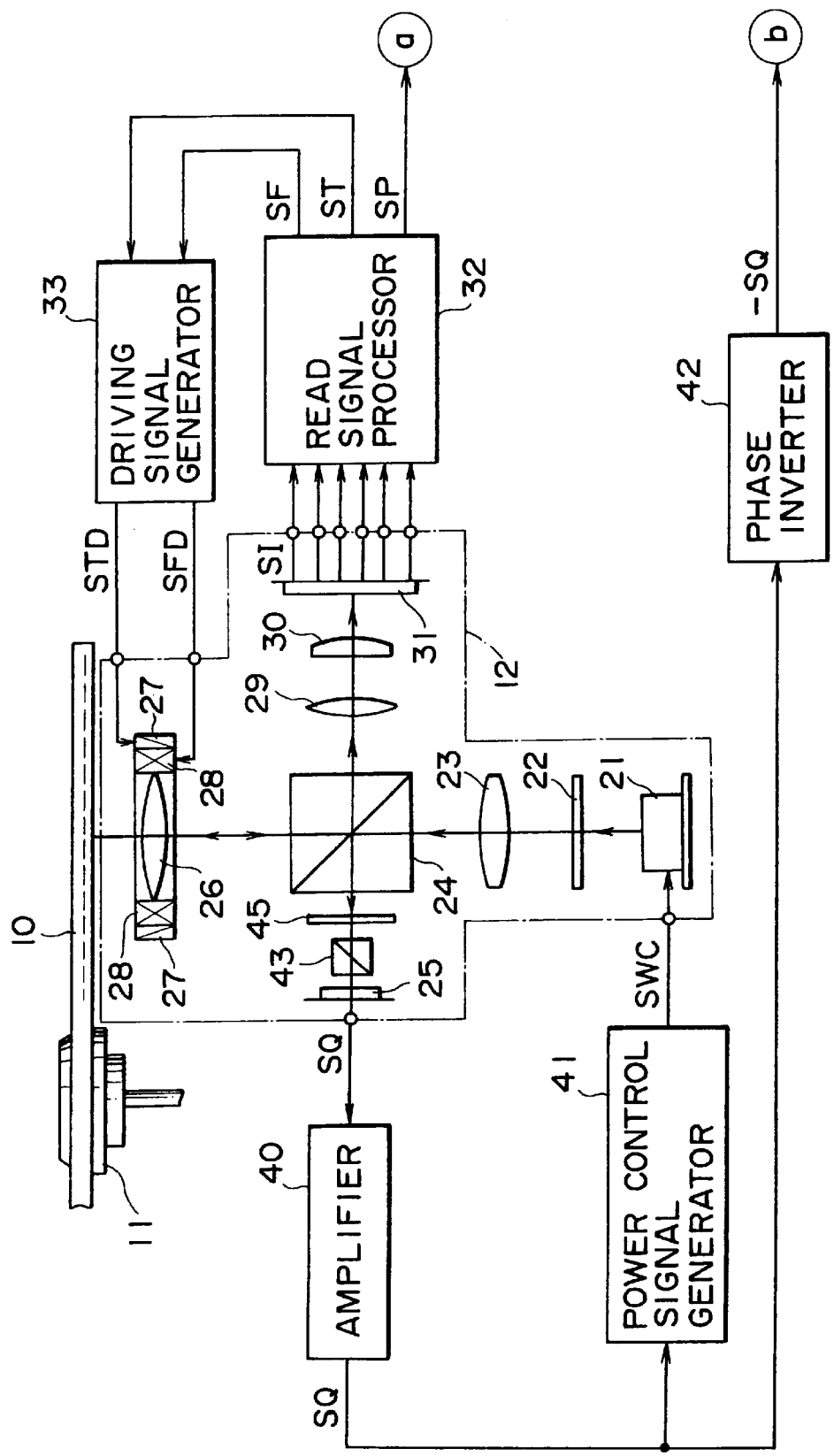

FIG. 6 shows principal component units in a second embodiment representing the optical disk player of the present invention. The second embodiment of FIG. 6 is constituted by additionally providing, in the aforementioned first embodiment of FIG. 1, a polarized beam splitter 43 and a half wavelength plate 45 on the optical path between the beam splitter 24 and the light receiver 25 incorporated in the optical head 12. Thus, the second embodiment of FIG. 6 is mostly similar in configuration to the first embodiment of FIG. 1. Therefore, any component units and signals in FIG. 6 corresponding to those in FIG. 1 are denoted by common reference numerals and symbols, and a repeated explanation thereof is omitted.

In the second embodiment of FIG. 6, the half wavelength plate 45, which is disposed on the optical path between the beam splitter 24 and the light receiver 25 incorporated in the optical head 12, is adjustable with rotation. The half wavelength plate 45 is rotatable through a required angle to thereby limit the quantity of the laser beam which is incident on the light receiver 25 after being reflected by the beam splitter 24. This beam corresponds to a portion of the laser beams incident on the beam splitter 24 from the collimator lens 23, i.e., a portion of the laser means transmitted toward the optical disk 10 from the collimator lens 23 to be incident on the disk 10. Thus, the half wavelength plate 45 is adjusted with rotation to thereby adjust the quantity of the laser beam incident on the light receiver 25, hence adjusting the level of the variation detection signal SQ obtained from the light receiver 25, and further the level of the phase-inverted variation detection signal −SQ obtained from the phase inverter 42.

In the second embodiment of FIG. 6, the half wavelength plate 45 is so adjusted with rotation that the level of the phase-inverted variation detection signal −SQ can be equalized to the level of the laser noise component included in the read data signal SP obtained from the amplifier 34, whereby the laser noise component remaining in the read data signal SPO outputted from the signal adder 35 is reducible substantially to zero or a minimal value.

FIG. 7 shows principal component units in a third embodiment representing the optical disk player of the present invention. The third embodiment of FIG. 7 is constituted by additionally providing, in the aforementioned first embodiment of FIG. 1, a level controller 46 between the phase inverter 42 and the signal adder 35. Thus, the third embodiment of FIG. 7 is mostly similar in configuration to the first embodiment of FIG. 1. Therefore, any component units and signals in FIG. 7 corresponding to those in FIG. 1 are denoted by common reference numerals and symbols, and a repeated explanation thereof is omitted.

In the third embodiment of FIG. 7, the level controller 46 disposed between the phase inverter 42 and the signal adder 35 adjusts the level of the phase-inverted variation detection signal –SQ obtained from the phase inverter 42, and then supplies the level-adjusted phase-inverted variation detection signal –SQ to the signal adder 35. Subsequently, the level-adjusted phase-inverted variation detection signal –SQ supplied to the signal adder 35 is added to the read data signal SP which is supplied also to the signal adder 35 from the amplifier 34. Such level adjustment for the phase-inverted variation detection signal –SQ obtained from the phase inverter 42 is performed through, for example, manual adjustment of the level controller 46.

In the third embodiment of FIG. 7, the level controller 46 is so adjusted that the level of the phase-inverted variation detection signal –SQ can be equalized to the level of the laser noise component included in the read data signal SP obtained from the amplifier 34, whereby the laser noise component remaining in the read data signal SPO outputted from the signal adder 35 is reducible substantially to zero or a minimal value. In the third embodiment of FIG. 7, the amplifier 40, the phase inverter 42 and the level controller 46 constitute a noise suppressor which reduces the laser noise component included in the read data signal SPO obtained from the signal adder 35.

Figure 8A:
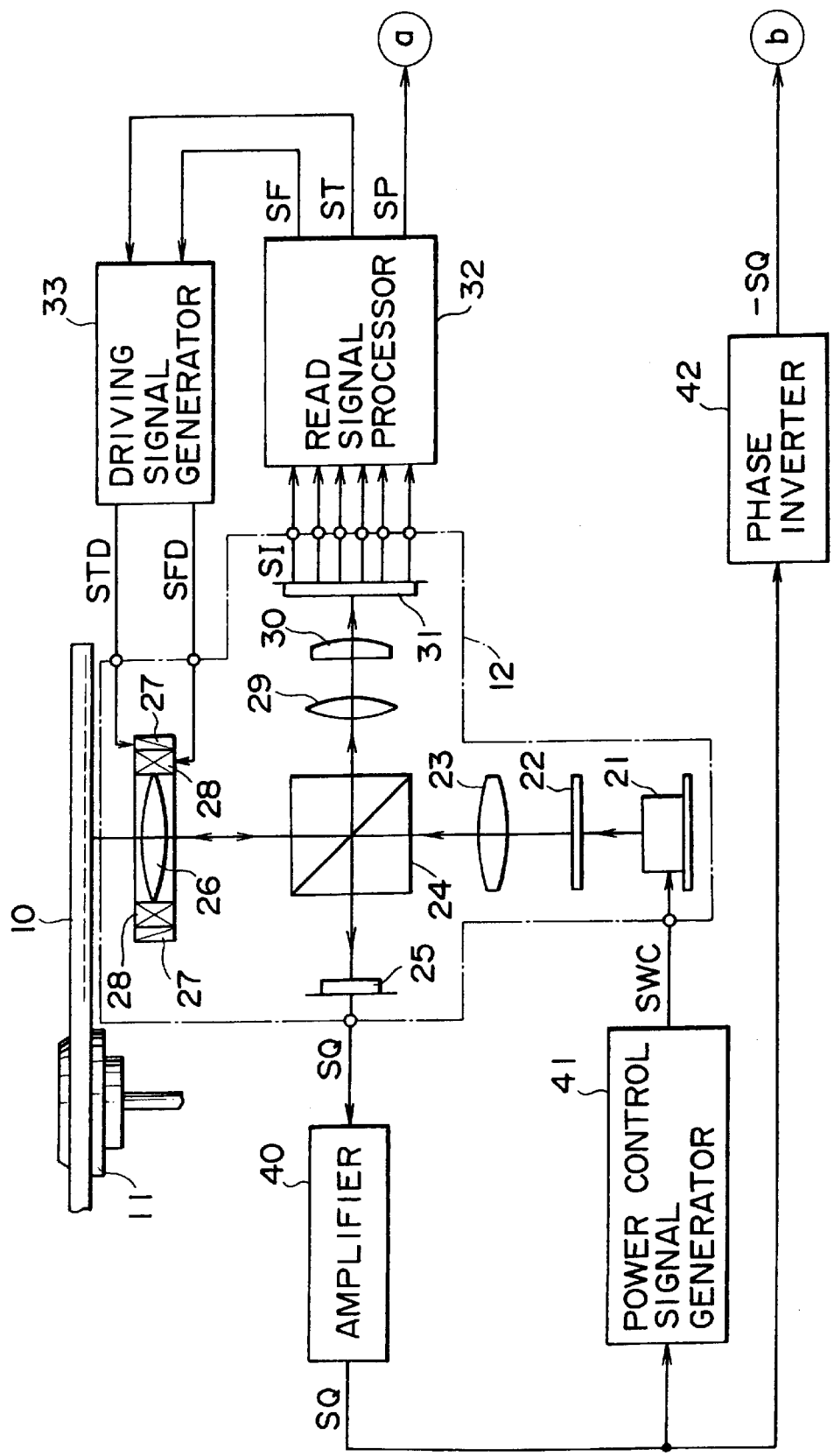

FIG. 8 shows principal component units in a fourth embodiment representing the optical disk player of the present invention. The fourth embodiment of FIG. 8 is constituted by additionally providing, in the aforementioned third embodiment of FIG. 7, a low pass filter (LPF) 47 which serves as a control signal generator relative to the level controller 46. Thus, the fourth embodiment of FIG. 8 is mostly similar in configuration to the first and third embodiments of FIGS. 1 and 7. Therefore, any component units and signals in FIG. 8 corresponding to those in FIGS. 1 and 7 are denoted by common reference numerals and symbols, and a repeated explanation thereof is omitted.

In the fourth embodiment of FIG. 8, the LPF 47 serving as a control signal generator relative to the level controller 46 inputs the read data signal SP obtained from the amplifier 34, then extracts merely the low frequency component (average level component) of the read data signal SP to thereby generate a control signal SAP, and supplies such control signal SAP to the level controller 46, so that the level adjustment of the phase-inverted variation detection signal –SQ in the level controller 46 is performed in accordance with the control signal SAP.

The low frequency component of the read data signal SP obtained from the amplifier 34 has a level corresponding to the quantity of the laser beam which is reflected from the optical disk 10 and is caused to be incident on the light receiver 31 incorporated in the optical head 12, i.e., a level corresponding to the reflectivity of the optical disk 10. Thus, the LPF 47 constitutes a control signal generator for producing a control signal SAP which has the level corresponding to the reflectivity of the optical disk 10.

In the level controller 46, the level adjustment for the phase-inverted variation detection signal –SQ is controlled by the control signal SAP having a level corresponding to the reflectivity of the optical disk 10. As a result, the level of the phase-inverted variation detection signal –SQ supplied from the level controller 46 to the signal adder 35 is equalized to the level of the laser noise component which is included in the read data signal SP supplied from the amplifier 34 to the signal adder 35 and represents the change corresponding to the reflectivity of the optical disk 10, whereby the laser noise component remaining in the read data signal SPO outputted from the signal adder 35 is reducible substantially to zero or a minimal value. In the fourth embodiment of FIG. 8, the amplifier 40, the phase inverter 42 and the level controller 46 constitute a noise suppressor which reduces the laser noise component included in the read data signal SPO obtained from the signal adder 35.

Figure 9A:
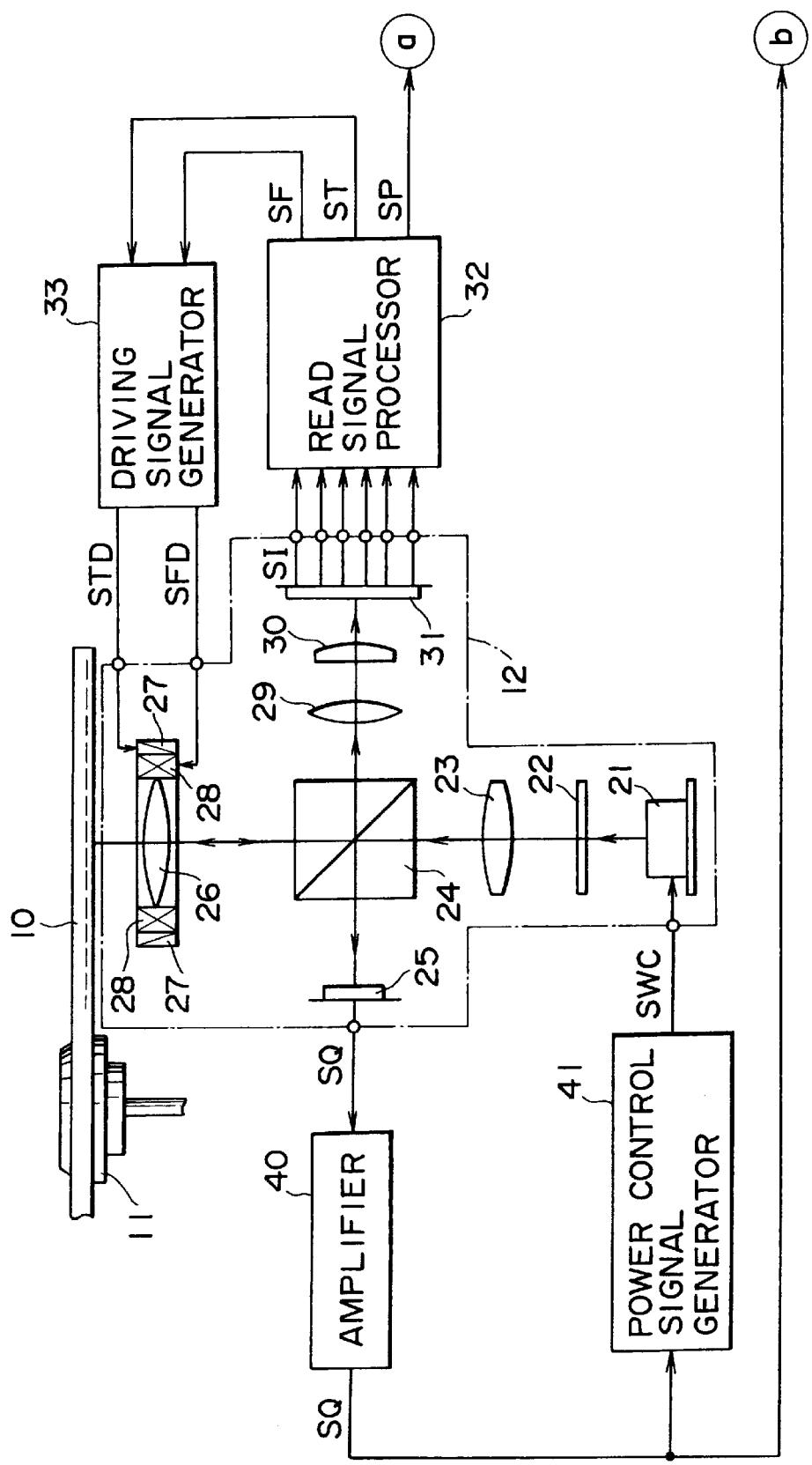
FIGS. 9A and 9B block connection diagrams showing principal component units in a fifth embodiment of the optical disk player of the invention.
Figures 9, 9B:
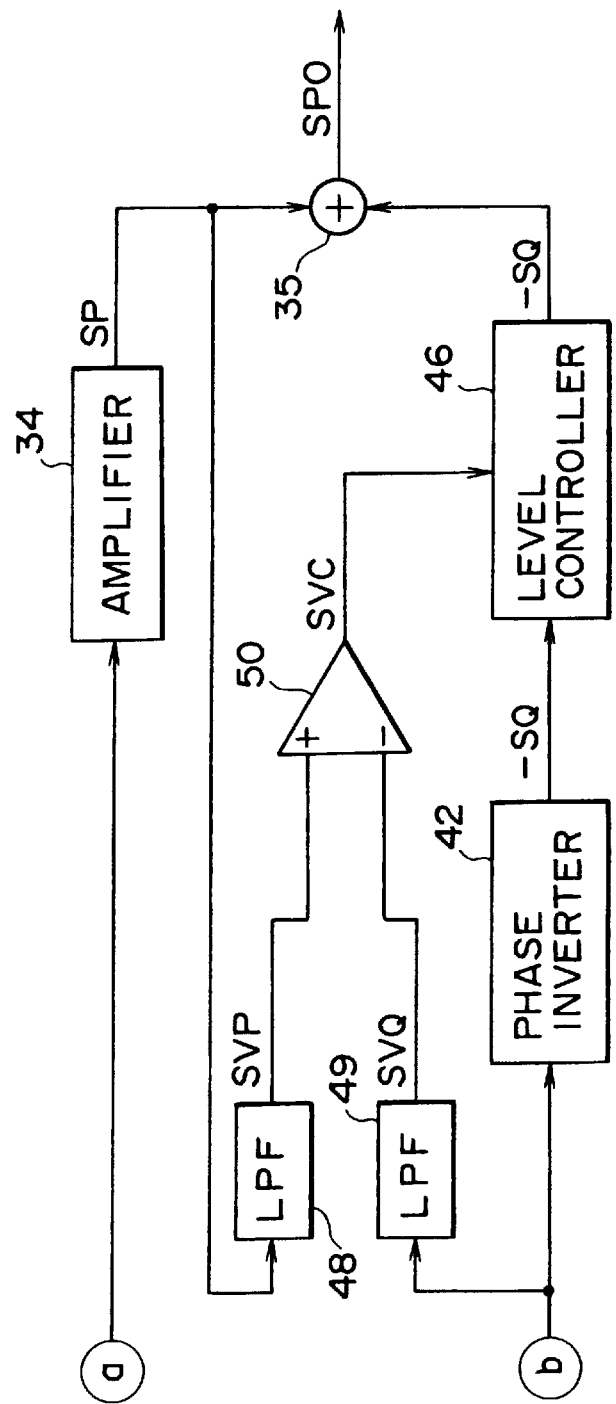

FIG. 9 shows principal component units in a fifth embodiment representing the optical disk player of the present invention. The fifth embodiment of FIG. 9 is constituted by additionally providing, in the aforementioned third embodiment of FIG. 7, an LPF 48, an LPF 49 and a level comparator 50 which serve as a control signal generator relative to the level controller 46. Thus, the fifth embodiment of FIG. 9 is mostly similar in configuration to the first and third embodiments of FIGS. 1 and 7. Therefore, any component units and signals in FIG. 9 corresponding to those in FIGS. 1 and 7 are denoted by common reference numerals and symbols, and a repeated explanation thereof is omitted.

In the fifth embodiment of FIG. 9, the LPF 48 inputs the read data signal SP obtained from the amplifier 34, and then extracts merely the low frequency component (average level component) of the read data signal SP to thereby generate an average level signal SVP. Meanwhile the LPF 49 inputs the variation detection signal SQ obtained from the amplifier 40, and then extracts merely the low frequency component (average level component) of the variation detection signal SQ to thereby generate an average level signal SVQ. The average level signal SVP obtained from the LPF 48 and the average level signal SVQ from the LPF 49 are supplied to the level comparator 50, which produces a control signal SVC composed of its comparison output having the level equal to the difference between the respective levels of the average level signals SVP and SVQ. Ths control signal SVC thus outputted from the level comparator 50 is supplied to the level controller 46, so that the level adjustment for the phase-inverted variation detection signal –SQ in the level controller 46 is performed in accordance with the control signal SVC.

Consequently, the level of the phase-inverted variation detection signal –SQ obtained from the level controller 46 and supplied to the signal adder 35 is controlled in accordance with the level difference between the average level component of the read data signal SP and the average level component of the variation detection signal SQ, thereby being equalized to the level of the laser noise component included in the read data signal SP which is obtained from the amplifier 34 and is supplied to the signal adder 35. Therefore the laser noise component remaining in the read data signal SPO obtained from the signal adder 35 is reduced substantially to zero or a minimal value. Thus, in the fifth embodiment of FIG. 9, such amplifier 40, phase inverter 42, level controller 46, LPFs 48, 49 and level comparator 50 constitute a noise suppressor which reduces the laser noise component included in the read data signal SPO obtained from the signal adder 35.

In the first embodiment shown in FIG. 1 and any of the second to fifth embodiments shown in FIGS. 6 to 9, the phase-inverted variation detection signal −SQ obtained from the phase inverter 42, or the level-controlled phase-inverted variation detection signal −SQ obtained via the level controller 46 through level control of the phase-inverted variation detection signal −SQ outputted from the phase inverter 42, is added to the read data signal SP obtained from the read signal processor 32, whereby the laser noise component included in the read data signal SP is reduced. However, in the optical disk player of the present invention, the above may be so modified that the phase-inverted variation detection signal −SQ obtained from the phase inverter 42, or the level-controlled phase-inverted variation detection signal −SQ obtained via the level controller 46 through level control of the phase-inverted variation detection signal −SQ outputted from the phase inverter 42, is added to the read output signal SI supplied to the read signal processor 32 from the light receiver 31 incorporated in the optical head 12, whereby the laser noise component included in the read data signal SP from the read signal processor 32 is reduced. In this case, the level of the phase-inverted variation detection signal −SQ obtained from the phase inverter 42, or that of the level-controlled phase-inverted variation detection signal −SQ obtained via the level controller 46 through level control of the phase-inverted variation detection signal −SQ outputted from the phase inverter 42, is so adjusted as to be equal to the level of the laser noise component which is included in the read output signal SI supplied from the light receiver 31 to the read signal processor 32.

Further, in any of the third to fifth embodiments shown in FIGS. 7 to 9, the variation detection signal SQ obtained from the amplifier 40 is supplied to the phase inverter 42, and the level of the phase-inverted variation detection signal −SQ outputted from the phase inverter 42 is adjusted by the level controller 46. However, the above may be so modified that the variation detection signal SQ obtained from the amplifier 40 is supplied to the phase inverter 42 after level adjustment by the level controller 46, and the level-adjusted phase-inverted variation detection signal −SQ is outputted from the phase inverter 42.

Thus, in the optical disk player mentioned above, the second light receiver for producing a variation detection signal by partially detecting the laser beam transmitted toward the optical disk to be incident thereon is incorporated in addition to the first light receiver for producing a read output signal by detecting the light beam reflected from the optical disk, and under such condition, the noise suppressor inverts the phase of the variation detection signal obtained from the second light receiver, and then adds the phase-inverted signal to the read output signal obtained from the first light receiver or to the read data signal from the read signal processor, whereby the laser noise component included in the read data signal from the read signal processor is canceled and reduced by the phase-inverted variation detection signal outputted from the second light receiver. Therefore, due to proper adjustment of the level of the phase-inverted variation detection signal obtained from the second light receiver, the laser noise component included in the read data signal outputted from the read signal processor can be suppressed efficiently and completely in the relatively simplified configuration.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An optical disk player comprising:

a light source capable of emitting laser light therefrom;

a first light receiver for producing a read output signal by detecting a light beam reflected from an optical disk, said light beam being based on the laser light emitted from said light source to be incident on the optical disk and reflected therefrom after being modulated in accordance with data recorded on said optical disk;

a read signal processor for producing a read data signal on the basis of the read output signal obtained from said first light receiver;

a second light receiver for partially detecting the light beam transmitted toward said optical disk to be incident thereon, and producing a variation detection signal representative of any variation in the detected light beam; and a noise suppressor for reducing the laser noise component included in the read data signal by first inverting the phase of the variation detection signal obtained from said second light receiver and then adding the phase-inverted variation detection signal to the read output signal obtained from said first light receiver or to the read data signal obtained from said read signal processor.

2. The optical disk player according to claim 1, further comprising a light quantity adjusting means to adjust the light quantity of a portion of the laser beam detected by said second light receiver.

3. The optical disk player according to claim 2, wherein said light quantity adjusting means consists of a rotationally adjustable half wavelength plate and a polarized light beam splitter disposed on an optical path of the portion of the light beam detected by said second light receiver.

4. The optical disk player according to claim 1, wherein said noise suppressor has a level adjusting means for adjusting the level of the phase-inverted variation detection signal added to the read output signal obtained from said first light receiver or to the read data signal obtained from said read signal processor.

5. The optical disk player according to claim 4, wherein said level adjusting means equalizes the level of the phase-inverted variation detection signal to the level of the laser noise component included in the read output signal obtained from said first light receiver, or to the level of the laser noise component included in the read data signal obtained from said read signal processor.

6. The optical disk player according to claim 4, wherein the light beam detected by said first light receiver is a return beam reflected from the optical disk, and said noise suppressor has a control signal generator to generate a control signal of a level corresponding to the reflectivity of the optical disk, and said level adjusting means is controlled by the control signal outputted from said control signal generator.

7. The optical disk player according to claim 6, wherein said control signal generator consists of a low pass filter supplied with the read data signal obtained from said read signal processor.

8. The optical disk player according to claim 6, wherein said control signal generator comprises a first low pass filter supplied with the read data signal obtained from said read signal processor, a second low pass filter supplied with the variation detection signal obtained from said second light receiver, and a level difference detector for producing a control signal of a level which corresponds to the level difference between the output signal of said first low pass filter and the output signal of said second low pass filter.

9. The optical disk player according to claim 1, further comprising a power control means for controlling the light source in response to the variation detection signal obtained from said second light receiver, such a manner as to maintain said light source in a state of emitting its laser light substantially with a constant power.

* * * * *